United States Patent [19]
Stroud

[11] Patent Number: 5,540,212
[45] Date of Patent: Jul. 30, 1996

[54] GRILL AERATOR AND WASTE RECEPTACLE

[76] Inventor: Michael W. Stroud, 1409 Roper Mt Rd., Greenville, S.C. 29615

[21] Appl. No.: 511,592

[22] Filed: Aug. 4, 1995

[51] Int. Cl.⁶ .................................................. A47J 37/00
[52] U.S. Cl. ...................... 126/25 R; 126/9 R; 126/25 B
[58] Field of Search ................................ 126/9 R, 25 R, 126/9 B, 9 A, 25 B, 41 R, 152 R, 163 R, 163 A

[56]         References Cited
         U.S. PATENT DOCUMENTS

| D. 299,690 | 2/1989 | Schnack et al. . | |
|---|---|---|---|
| 1,966,945 | 7/1934 | Bowers | 126/9 B |
| 3,191,591 | 6/1965 | Bennett | 126/25 R |
| 3,353,527 | 11/1967 | Anderson | 126/25 R |
| 3,684,087 | 8/1972 | Anderson . | |
| 3,931,805 | 1/1976 | Nelson | 126/25 R |
| 4,276,869 | 7/1981 | Kern . | |
| 4,762,059 | 8/1988 | McLane, Sr. . | |
| 4,763,640 | 8/1988 | Schnack et al. . | |
| 4,895,134 | 1/1990 | Fielding et al. . | |
| 4,958,618 | 9/1990 | Davidson . | |
| 5,165,385 | 11/1992 | Doolittle et al. . | |
| 5,226,405 | 7/1993 | Snow . | |

*Primary Examiner*—James C. Yeung
*Attorney, Agent, or Firm*—Richard C. Litman

[57]         ABSTRACT

A grill aerator and waste receptacle in the form of a pan having frustoconical air towers projecting from its bottom. The pan fits in the bowl of a barbecue grill under the grate supporting the charcoal bed. When placed in the grill bowl, the pan collects ash and drippings from food, while the air towers direct air through the charcoal bed.

5 Claims, 3 Drawing Sheets

GRILL AERATOR AND WASTE RECEPTACLE

BACKGROUND OF THE INVENTION

1. Field of the Invention

The present invention relates to an accessory for an outdoor grill which aids in the more rapid ignition of the charcoal and keeps the grill clean by acting as a receptacle for ash and grease drippings.

2. Description of the Prior Art

Charcoal grills are commonly used for cooking foodstuffs such as meats and vegetables in the outdoors, for example during backyard barbecues. Such grills usually have a bowl within which a grate is supported. The grate in turn supports the burning charcoal. At the bottom of the bowl vent holes are provided to allow circulation of air through the burning charcoal. A major drawback of these types of grills is that falling charcoal ash and dripping juices and grease from the foodstuffs being cooked, tends to soil the bottom of the grill bowl and clog the vent holes.

Removing the ash and cleaning the bottom of the grill bowl is a laborious and unsavory chore because the soil is burned onto the surface of the bowl bottom, and thus the soil strongly adheres to the surface of the bowl bottom. Therefore, hazardous chemicals and hard scrubbing must be employed to clean the grill bowl, thus subjecting the person cleaning the grill to hard physical exertion and to the unpleasant odors of hazardous cleaning chemicals and burnt animal and vegetable matter.

For the aforementioned reasons, various devices have been proposed in the prior art for preventing ash, and drippings from food, from falling to the bottom of the grill bowl. However, none of the references discussed below are seen to teach or suggest a pan having the projecting air towers of the present invention.

The present invention has the further advantage that the air towers greatly facilitate the circulation of air past the charcoal bed, thus leading to a quicker ignition of the charcoal and to the charcoal burning at a hotter temperature.

U.S. Pat. No. 5,165,385, issued to Doolittle et al., shows an outdoor grill having a removable receptacle at the bottom of the grill bowl for collecting ash. Doolittle et al. do not teach or suggest an ash and drippings collector usable with existing grills.

U.S. Pat. No. 4,958,618, issued to Davidson, shows a hexagonal bowl with projections at its bottom. The hexagonal bowl forms part of a disposable cooking apparatus. Davidson does not teach or suggest the air towers of the present invention.

U.S. Pat. No. 4,895,134, issued to Fielding et al., shows a barbecue grill ash collector which attaches to the legs supporting the grill. The ash collector has a sliding bottom to allow the ashes to be emptied into a trash bag. Fielding et al. do not show a waste receptacle that fits inside the bowl of a charcoal grill.

U.S. Pat. No. 5,226,405, issued to Snow, shows a charcoal igniting device having upper and lower plates which are spaced apart to define an air space therebetween. The upper plate has air outlet apertures extending therethrough, and the lower plate has air inlet apertures extending therethrough. Snow does not show a receptacle for ash and drippings.

U.S. Pat. No. 4,763,640, issued to Schnack et al., shows a barbecue grill ash collector which attaches to the legs supporting the grill. The ash collector has a support ring and a catch basin movably attached to the support ring. U.S. Pat. No. 4,763,640, does not show a waste receptacle that fits inside the bowl of a charcoal grill.

U.S. Pat. No. 4,762,059, issued to McLane, Sr., shows a grease collector for a gas grill. McLane, Sr., does not show an ash receptacle or the air towers of the present invention.

U.S. Pat. No. 4,276,869, issued to Kern, shows a molded refractory slab for use with a grill. The slab is a flat piece of material with frustoconical projections. Kern does not show the air towers of the present invention.

U.S. Pat. No. 3,684,087, issued to Anderson, shows a portable grilling apparatus having a pan for holding the charcoal and a perforated plate above the pan to support foodstuffs. Anderson does not teach or suggest the air towers of the present invention.

U.S. Pat. No. Des. 299,690, issued to Schnack et al., shows a barbecue grill ash collector which attaches to the legs supporting the grill. The ash collector has a support ring and a catch basin movably attached to the support ring. U.S. Pat. No. Des. 299,690, does not show a waste receptacle that fits inside the bowl of a charcoal grill.

None of the above inventions and patents, taken either singly or in combination, is seen to describe the instant invention as claimed.

SUMMARY OF THE INVENTION

The present invention is directed to a pan for collecting ash and drippings from food for use with a charcoal grill. The pan has frustoconical air towers projecting from the bottom thereof, and fits inside the bowl of a barbecue grill.

Accordingly, it is a principal object of the invention to provide a receptacle for collecting ash from a charcoal grill.

It is another object of the invention to provide an ash collection receptacle which directs air through the charcoal bed, thereby speeding ignition and enhancing the burning of the charcoal.

It is a further object of the invention to provide a receptacle which keeps drippings from food from falling to the bottom of the grill bowl.

Still another object of the invention is to provide a waste receptacle, for use with a barbecue grill, which is disposable and greatly simplifies the chore of cleaning the grill.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
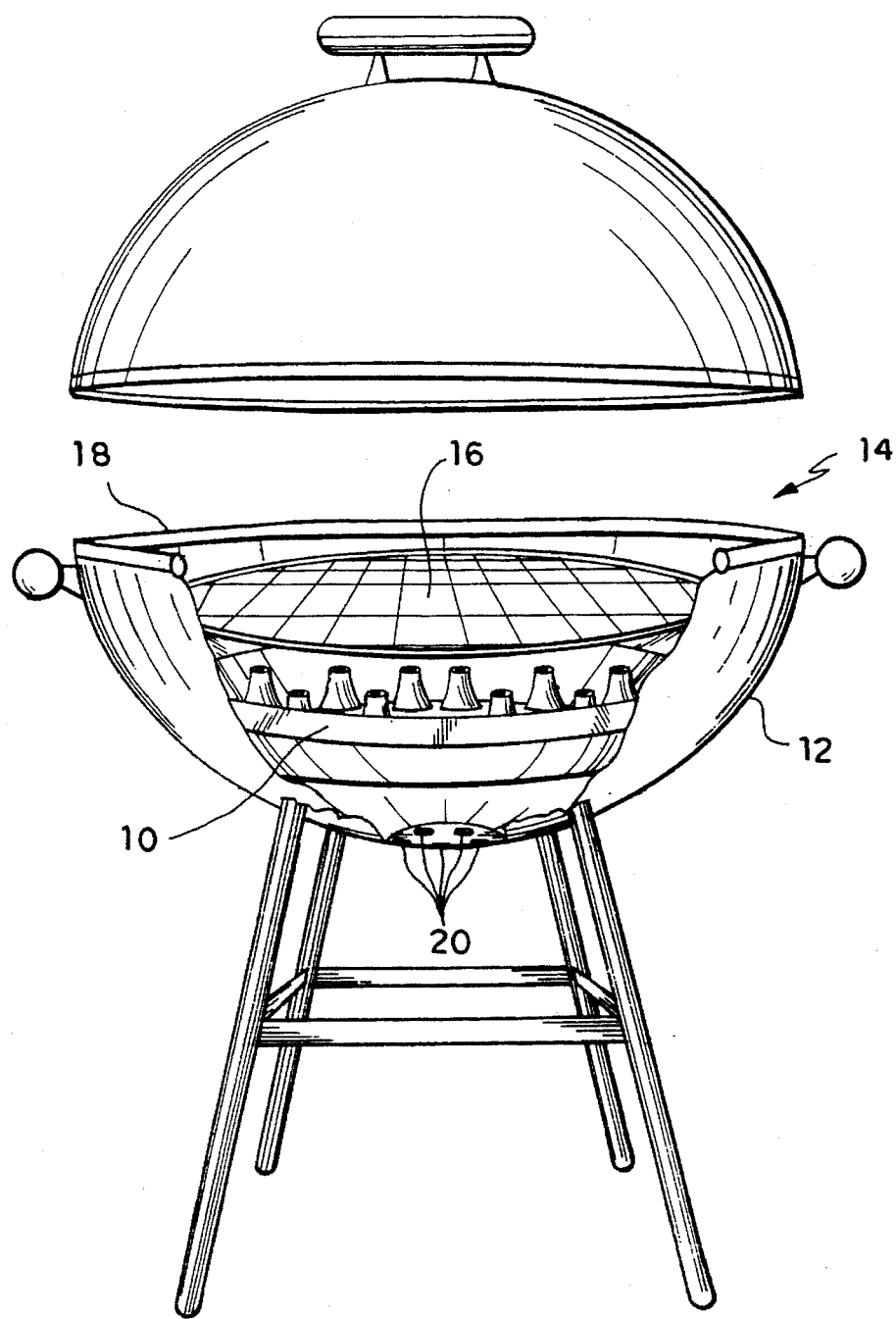
FIG. 1 is an environmental perspective view of the grill aerator and waste receptacle of the present invention, showing the present invention installed in a charcoal barbecue grill.

Referring to FIG. 1, the present invention is a grill aerator and waste receptacle 10 which fits in the bowl 12 of a barbecue grill 14 under the grate 16 which normally supports the charcoal bed.

Charcoal grill 14 is of the type commonly used for cooking foodstuffs such as meats and vegetables in the outdoors, for example during backyard barbecues. Grill 14 has a bowl 12 within which a grate 16 is supported. The grate 16 in turn supports the burning charcoal used for cooking. A second grate (not shown) is normally positioned near rim 18, above grate 16, to support the foodstuffs being cooked. At the bottom of the bowl 12 vent holes 20 are provided to allow circulation of air through the burning charcoal.

Figure 2:
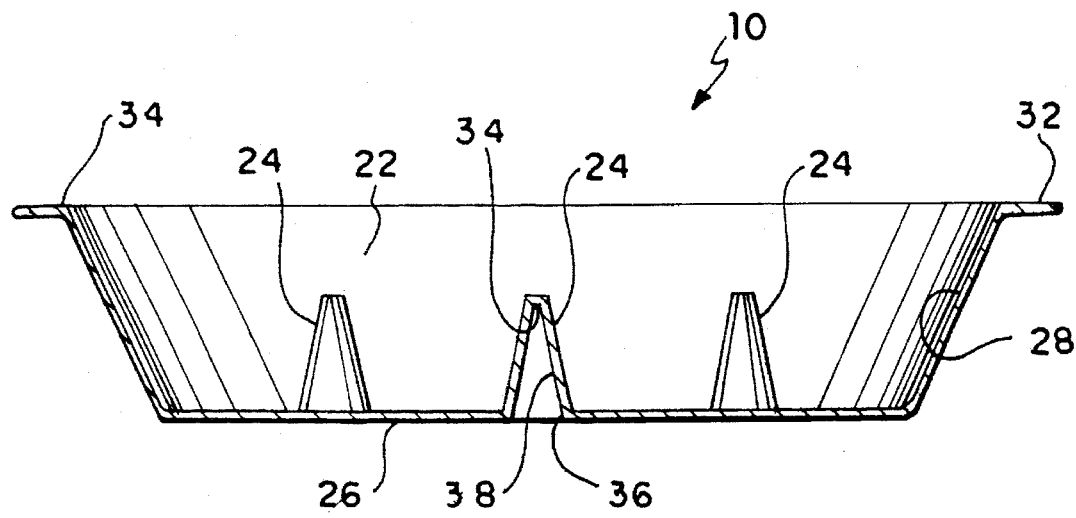
FIG. 2 is a cross sectional view of the grill aerator and waste receptacle of the present invention.
Figure 3:
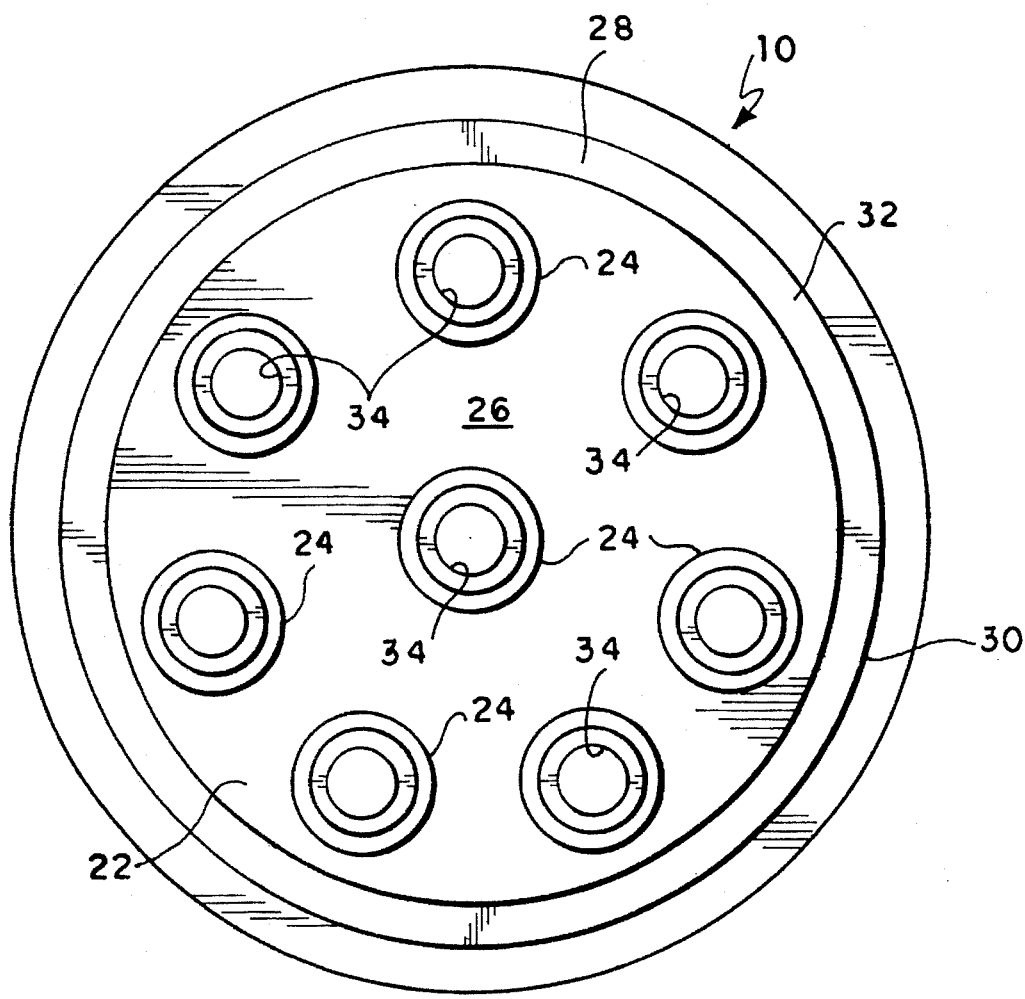
FIG. 3 is a top plan view of the grill aerator and waste receptacle of the present invention.

Referring to FIGS. 2 and 3, receptacle 10 is in the form of a pan 22 having frustoconical air towers 24 projecting from its bottom 26. The pan 22 has a substantially flat bottom 26. A sidewall 28 extends from the perimeter of the circular bottom 26. The sidewall 28 extends from the perimeter of the bottom 26 at an incline making the sidewall 28 sloped. The sidewall 28 terminates at a top edge 30. The sloping sidewall results in the pan 22 being flared out such that the open top of the pan has a greater area than the bottom 26, i.e. the area of the projection of the top edge 30, onto the plane containing the bottom 26, is greater than the area of the bottom 26. An annular rim 32 extends from the top edge 30 in a plane parallel to the plane defined by the bottom 26. The annular rim 32 is dimensioned to be engageable with the bowl 12, and to support the receptacle 10 within the bowl 12 above the bottom of the bowl.

Each of the plurality of air towers 24 projecting from the bottom 26, has a tip opening 34. The bottom 26 has a plurality of openings 36 corresponding in number and location to the air towers 24. Each of the air towers 24 has a through bore 38 extending from a respective tip opening 34 to a respective bottom opening 36. Both the air towers 24 and the through bores 38 within them are frustoconical in shape and taper from a large diameter near the bottom 26 to a small diameter near the tip of the air towers 24. The air towers 24 thus allow air from the vent holes 20 to pass through receptacle 10 and be directed to the grate 16 and the charcoal bed that would be supported by grate 16 during cooking.

Preferably the air towers 24 have a height lower than the height of the sidewall 28 above the bottom 26.

When placed in the grill bowl 12, below the grate 16 supporting the charcoal bed, the pan 22 collects ash and drippings from food, while the air towers 24 direct air through the charcoal bed thereby leading to a quicker ignition of the charcoal and to the charcoal burning at a hotter temperature.

The receptacle 10 can be made of a variety of metals including aluminum, steel, and galvanized metals, using any of a wide variety of well known metal article manufacturing techniques. Optionally, the receptacle 10 may be made of very thin aluminum sheet, such as the kind used in making disposable cookie sheets and roasting pans, thereby allowing the receptacle 10 to be made disposable, i.e. the receptacle 10 can be discarded after only one use.

It is to be understood that the present invention is not limited to the sole embodiment described above, but encompasses any and all embodiments within the scope of the following claims.

I claim:

1. A receptacle comprising:

a pan having a substantially flat bottom, said bottom having a perimeter, said pan also having a sidewall extending from said perimeter; and a plurality of air towers projecting from said bottom and being positioned in a spaced relationship evenly distributed over the entire bottom; said bottom having a plurality of openings therein, said plurality of openings corresponding in number to said plurality of air towers, each of said plurality of openings being in registry with a respective one of said plurality of air towers, and each of said plurality of air towers having a through bore extending from a respective one of said plurality of openings to a respective tip of each of said plurality of air towers, said through bore in each of said plurality of air towers intersecting said respective tip of each of said plurality of air towers to form a tip opening in each of said plurality of air towers;

said plurality of openings and said tip opening in each of said plurality of air towers are circular and have respective diameters, each of said plurality of air towers is frustoconical in shape and tapers from a first diameter base at said bottom to a smaller second diameter tip, and said through bore in each of said plurality of air towers is also frustoconical in shape, tapering from said diameter of said respective one of said plurality of openings to said diameter of said tip opening in a respective one of said plurality of air towers;

further each of said plurality of air towers having a height which is substantially greater than said first diameter of said base and all portions of said bottom not occupied by said plurality of air towers, being substantially coplanar.

2. The receptacle according to claim 1, wherein each of said plurality of air towers has a first height, and said sidewall has a second height above said bottom which is greater than said first height.

3. The receptacle according to claim 1, wherein said sidewall extends from said perimeter and terminates at a top edge, said sidewall being sloped such that said top edge has a projection, in a plane defined by said bottom, which has an area which is larger than an area circumscribed by said perimeter.

4. The receptacle according to claim 3, wherein said receptacle is for use with a barbecue grill having a bowl, the bowl having a bottom, said top edge and said perimeter are circular, and said receptacle further includes an annular rim extending from said top edge in a plane parallel to said plane defined by said bottom, said annular rim being engageable with the bowl to support said receptacle within the bowl above the bottom of the bowl.

5. The receptacle according to claim 1, wherein said receptacle is made of a sufficiently thin aluminum sheet material so as to render the receptacle disposable.

* * * * *